May 3, 1949.   J. C. GARAND   2,468,745
BROACHING CUTTER
Filed Sept. 23, 1944
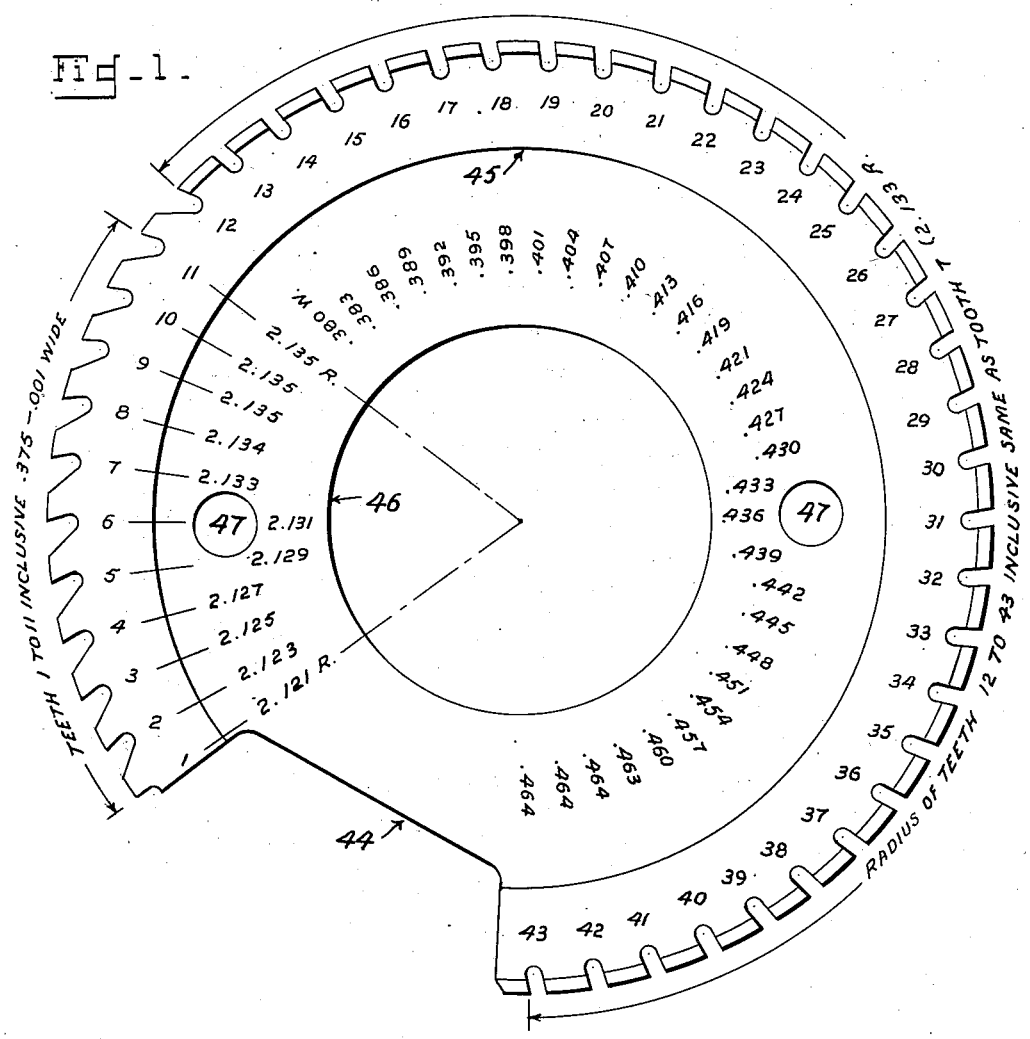
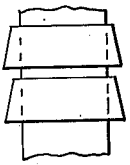
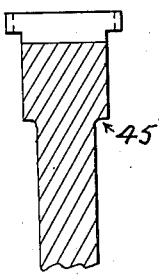
Inventor
John C. Garand Patented May 3, 1949

2,468,745

UNITED STATES PATENT OFFICE 2,468,745

BROACHING CUTTER

John C. Garand, Springfield, Mass.

Application September 23, 1944, Serial No. 555,566

3 Claims. (Cl. 29—95.1)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a circular broaching cutter.

Undercutting in an arcuate recess or groove has been a difficult and time-consuming operation. Two widely employed methods, the use of (1) a side cutting shoulder on a milling cutter or (2) a boring tool have each required the exercise of considerable skill and patience in order to attain accurate results. Neither of these methods is adapted for even semi-automatic machine tool production application when a high degree of precision is required. The result is that such cuts, in production work, have been avoided by designers because of the well known difficulty of obtaining the required accuracy by means of production machine tool methods.

It is therefore the purpose of this invention to provide a means whereby undercuts in arcuate recesses or grooves can be made quickly and accurately on a production basis by an ordinary machine operator on a semi-automatic machine tool.

It is a particular object of this invention to provide a circular, multi-toothed cutting tool or broaching cutter in which is provided a cut-away section for inserting the work in position to be acted upon by the cutter teeth, said teeth being of progressively increasing height or width whereby an undercut may be produced in an arcuate recess.

The specific nature of this invention as well as other objects and advantages thereof will clearly appear from a description of a preferred embodiment as shown in the accompanying drawing in which:

Fig. 1 is a side elevational view of a cutter constructed in accordance with this invention.

Fig. 2 is a sectional view of one of the teeth of the cutter shown in Fig. 1.

Fig. 3 is a top elevational view of a portion of Fig. 1.

Fig. 1 shows a side view of a preferred embodiment of this invention comprising a circular body portion 50 provided with radial teeth 1 to 43 inclusive, a cut-away section 44, rim 45, center hole 46 and pin holes 47.

The cut-away section 44 is roughly of a size to allow moving the work piece sideways into position for the cutter to act upon it.

Teeth 1 to 9 inclusive are of uniform width but of progressively increasing height. Teeth 9, 10 and 11 are of the same dimensions to provide opportunity for resharpening. Teeth 12 to 43 inclusive are of uniform height, the same as tooth 7 (teeth 9, 10 and 11, being of maximum height). Teeth 12 to 41 inclusive however are of progressively increasing width adjacent the top of the tooth, so as to undercut the sides of the slot being formed, teeth 41, 42 and 43 being of the same dimensions, to provide opportunity for resharpening.

The cutter is made from a blank of conventional form, of which, rim 45 is cut into the aforesaid teeth 1 to 43, and cut-away section 44. Pin holes 47 are provided for locating the cutter in relation to the starting and stopping mechanism of the machine.

In operation, the cutter is used in connection with a milling machine of the single cycle, periodic type. The cutter is so positioned on the spindle that when the spindle is stopped, the cut-away permits insertion of the work in proper position to be acted upon by said cutter. This eliminates the necessity of feeding the cutter into the work, hence simplifies the type of milling machine that may be utilized and greatly improves the accuracy of the operation.

When the spindle is started, one complete revolution of the cutter occurs, the cut being finished by this single revolution, and the spindle and cutter stopping in the original position, in which position the work may be removed through the cut-away 44 and a new piece inserted.

While in the preferred embodiment, the first eleven teeth are formed to cut on the top and the following teeth to cut on the side, this arrangement should be understood to be merely a specific example and the invention is in no way limited to this particular arrangement, any combination of top cutting and/or side cutting or of special shaped teeth of any form or proportions is equally applicable to this invention.

It is therefore obvious that this invention as herein disclosed provides a means whereby undercuts in arcuate recesses or grooves can be made quickly and accurately on a production basis by an ordinary machine operator on a semi-automatic machine tool.

I claim:

1. A broaching cutter for producing undercut arcuate slots in a workpiece comprising a substantially circular body portion, said body portion having a peripheral opening arranged to permit insertion of a workpiece therein, a plurality of depth cutting teeth disposed in spaced relationship about the periphery of said body portion and transversely thereto, a first group of cutting teeth having each tooth successively greater radially displaced than the preceding cutting tooth and a successive group of said cutting teeth having cutting edges disposed on the sides thereof, each of said side cutting edges projecting outwardly with respect to said body portion to a greater extent than the preceding cutting edge.

2. A broaching cutter for producing undercut arcuate slots in a workpiece comprising a substantially circular body portion, said body portion having a substantially segmental shaped opening therein arranged to permit insertion of the workpiece therein, a plurality of cutting teeth disposed in spaced relationship about the periphery of said body portion, a first group of successive cutting teeth having depth cutting edges transversely disposed to said body portion and on the periphery thereof, each of said depth cutting edges projecting radially outward with respect to said body portion to a greater extent than the preceding cutting edge, and a second group of successive cutting teeth having cutting edges disposed on the sides thereof, each side cutting edge of said second group of successive cutting teeth constructed to project outwardly with respect to said body portion to a greater extent than the preceding cutting edge, said first group of cutting teeth being adjacent said segmental opening whereby rotation of said cutter brings said radially displaced cutting teeth into cutting engagement with the workpiece to produce an arcuate slot of desired depth, and said second group of cutting teeth disposed adjacent said first group of cutting teeth and being provided to undercut said arcuate slot produced by said first group of cutting teeth.

3. A broaching cutter for producing undercut arcuate slots in a workpiece in not more than one revolution, comprising, a substantially circular body portion, said body portion having a peripheral opening therein and a plurality of cutting teeth in spaced relationship about the remainder of the periphery of said body portion, locating means for mounting said cutter with its axis fixed relative to the workpiece and having said peripheral opening disposed adjacent the workpiece in non-cutting relation thereto, the cutting teeth of said cutter being disposed transversely on said body portion and on the periphery thereof and arranged to progressively radially cut the workpiece when said cutter is rotated, a successive group of said cutting teeth having cutting edges disposed on the sides thereof, each successive side cutting edge projecting outwardly with respect to said body portion to a greater extent than the preceding side cutting edge whereby the desired undercut arcuate slot is produced in the workpiece in not more than one revolution of said cutter.

JOHN C. GARAND.

REFERENCES CITED

The following references are of record in the file of this patent:

UNITED STATES PATENTS

| Number | Name | Date |
| --- | --- | --- |
| 28,672 | Jelliff | June 12, 1860 |

FOREIGN PATENTS

| Number | Country | Date |
| --- | --- | --- |
| 5,042 | Great Britain | Apr. 1, 1890 |
| 237,326 | Germany | Apr. 19, 1910 |